US012616920B2

(12) United States Patent
Loewe et al.

(10) Patent No.: US 12,616,920 B2
(45) Date of Patent: May 5, 2026

(54) SINGLE-USE DEVICE FOR THE SEPARATION OR FILTERING OF A LARGE VOLUME OF A MIXTURE OF SUBSTANCES

(71) Applicant: Sartorius Stedim Biotech GmbH, Goettingen (DE)

(72) Inventors: Thomas Loewe, Goettingen (DE); Sebastian Handt, Goettingen (DE); Stefan Schlack, Goettingen (DE); Martin Leuthold, Goettingen (DE)

(73) Assignee: SARTORIUS STEDIM BIOTECH GMBH (DE)

( * ) Notice: Subject to any disclaimer, the term of this patent is extended or adjusted under 35 U.S.C. 154(b) by 770 days.

(21) Appl. No.: 17/799,644

(22) PCT Filed: Feb. 4, 2021

(86) PCT No.: PCT/EP2021/052715
§ 371 (c)(1),
(2) Date: Aug. 12, 2022

(87) PCT Pub. No.: WO2021/160521
PCT Pub. Date: Aug. 19, 2021

(65) Prior Publication Data
US 2023/0073721 A1      Mar. 9, 2023

(30) Foreign Application Priority Data
Feb. 14, 2020    (DE) ..................... 10 2020 103 925.5

(51) Int. Cl.
| | |
|---|---|
| *B01D 15/18* | (2006.01) |
| *B01D 15/12* | (2006.01) |
| *B01D 29/52* | (2006.01) |
| *B01D 29/60* | (2006.01) |
| *B01D 69/14* | (2006.01) |

(52) U.S. Cl.
CPC ....... *B01D 15/1885* (2013.01); *B01D 15/125* (2013.01); *B01D 29/52* (2013.01); *B01D 29/603* (2013.01); *B01D 29/606* (2013.01); *B01D 69/147* (2013.01); *B01D 2201/16* (2013.01)

(58) Field of Classification Search
CPC .............. B01D 15/125; B01D 15/1871; B01D 15/1885; B01D 15/22; B01D 29/52; B01D 29/54; B01D 29/56; B01D 29/603; B01D 29/606; B01D 35/303; B01D 69/147; B01D 2201/16; B01D 2313/54; B01D 2313/58
See application file for complete search history.

(56) References Cited

U.S. PATENT DOCUMENTS

| | | |
|---|---|---|
| 10,696,940 B2 | 6/2020 | Maiser et al. |
| 11,161,078 B2 | 11/2021 | Loewe et al. |
| 2010/0144028 A1* | 6/2010 | Bisschops ................ C07K 1/36 |
| | | 210/143 |
| 2016/0144320 A1 | 5/2016 | Nishio et al. |
| 2017/0137461 A1* | 5/2017 | McManaway ......... B01J 20/286 |
| 2018/0117495 A1* | 5/2018 | Schwan ................... C07K 1/16 |
| 2018/0135006 A1 | 5/2018 | Maiser et al. |
| 2019/0083936 A1 | 3/2019 | Loewe et al. |
| 2019/0247769 A1 | 8/2019 | Massingill |
| 2020/0179837 A1 | 6/2020 | Loewe et al. |
| 2020/0353414 A1 | 11/2020 | Diel et al. |
| 2020/0360859 A1 | 11/2020 | Loewe et al. |
| 2021/0023564 A1 | 1/2021 | Schaefer |

FOREIGN PATENT DOCUMENTS

| | | | |
|---|---|---|---|
| CN | 204550255 U | 8/2015 | |
| CN | 105964034 A | 9/2016 | |
| CN | 207384972 U | 5/2018 | |
| DE | 102017111133 A1 | 11/2018 | |
| DE | 102018107679 A1 * | 10/2019 | ........... C12M 37/06 |
| EP | 2915571 B1 | 9/2015 | |
| WO | 2008127087 A1 | 10/2008 | |
| WO | 2011152788 A1 | 12/2011 | |
| WO | 2016015952 A1 | 2/2016 | |

(Continued)

OTHER PUBLICATIONS

Dixit, "Membranes and filtration Membrane filtration in the biopharm industry" (Year: 2008).*

(Continued)

*Primary Examiner* — Krishnan S Menon
*Assistant Examiner* — Tak L Chiu
(74) *Attorney, Agent, or Firm* — Dilworth IP, LLC

(57)         ABSTRACT

A single-use device for separating or purifying a large volume of a mixture of substances including membrane chromatography modules which are fixedly mounted in a predetermined grid and a line system for linking the membrane chromatography modules and for connecting the membrane chromatography modules to each other. A cover or bottom mechanism holding the membrane chromatography modules in position in a predetermined grid may be attached to the upper or lower side of the membrane chromatography modules. At least part of the line system is formed in the cover or the bottom mechanism, with connecting lines between the membrane chromatography modules. In a method of separating or purifying a large volume of a mixture of substances using such a single-use device having a plurality of automated valves and sensors connected to a control unit, the automated valves are controlled based on an evaluation of the parameters measured by the sensors.

19 Claims, 11 Drawing Sheets

(56) References Cited

FOREIGN PATENT DOCUMENTS

| | | | |
|---|---|---|---|
| WO | 2016177650 | A1 | 11/2016 |
| WO | 2017032560 | A1 | 3/2017 |
| WO | 2019096501 | A1 | 5/2019 |
| WO | 2019096502 | A1 | 5/2019 |
| WO | 2019185356 | A1 | 10/2019 |

OTHER PUBLICATIONS

Berruex, Laure G.; Freitag, Ruth: "Separation and purification of biochemicals", Encyclopedia of physical science and technology, 3rd edition, San Diego: Academic Press, 2002, pp. 651-673, ISBN 978-0-12-227410-7.

* cited by examiner

Venting / pressurized air

62c

62h

62e

62f

Venting / pressurized air

62j

62f

Venting / pressurized air

62b

62k

62a

62g

62a

62f

Pressurized air

62d

62i

62d

SINGLE-USE DEVICE FOR THE SEPARATION OR FILTERING OF A LARGE VOLUME OF A MIXTURE OF SUBSTANCES

FIELD OF THE INVENTION

The invention relates to a single-use device for separating or purifying a large volume of a mixture of substances.

BACKGROUND

In the pharmaceutical production of high-quality active ingredients, single-use devices are generally used to an increasing extent due to the high flexibility achievable therewith, and due to the saving of time, investments and operating expenditure such as the cleaning, validation and examination of such ingredients. Single-use devices are increasingly desired for a larger scale (large volume production processes), wherein the costs for such systems should not rise to an unrealistic extent.

WO 2017/032560 A1 shows a fully pre-sterilizable, ready-to-connect and integrity-testable single-use filtration device designed for large-volume filtration processes. This single-use filtration device comprises a plurality of single-use filter capsules of a standard size arranged in a predetermined grid and interconnected by lines. The filter capsules are supported by a rigid holder. A common air filter may be provided for venting the entire unit of the filter capsules.

A preconfigured single-use filtration device is known from DE 10 2017 111 133 A1. The filtration device comprises a plurality of single-use filter capsules interconnected by rigid lines, which are firmly mounted in a universally predetermined grid by a rigid holder. In this filtration device, a pressure-stable sight glass is integrated into a vent line between a vent port and a sterile air filter provided for venting all filter capsules. The sight glass allows medium rising to the air filter to be made visible to the operator. As soon as the operator detects that water or other medium is rising to the air filter, he closes an associated vent valve in the line and takes further action if necessary.

The known filtration devices can be integrated into a filtration train of a process arrangement by means of sterile connectors or hose welding, or in a non-sterile manner, for example by tri-clamp connections, and are thus "ready to use" after delivery to the user. Sterilization of the filtration devices even before delivery is possible.

SUMMARY

The object of the invention is to simplify the separation or purification of a large volume of a mixture of substances on the user-side and to make it safer by means of an optimized and flexible single-use device.

This object is achieved by a single-use device having the features of claim 1. Advantageous and useful embodiments of the single-use device according to the invention are specified in the subclaims.

The single-use device according to the invention for separating or purifying a large volume of a mixture of substances comprises a plurality of membrane chromatography modules which are fixedly mounted in a predetermined grid. The single-use device further comprises a line system for linking the membrane chromatography modules and for connecting the membrane chromatography modules to each other. The membrane chromatography modules, in particular with regard to membrane adsorber type, design and/or size, and/or the lines of the line system are preconfigured or adapted to be preconfigured for a desired process.

With regard to the scope of application of the single-use device according to the invention, a distinction must be made between small media volumes, such as those used in the laboratory when developing a new process (laboratory scale), and large media volumes, which are implemented in production processes (production scale). Though a clear delimitation between small and large media volumes is not readily possible, the publication "Membranadsorber-Chromatographische Aufreinigung in neuen Dimensionen" by Stefan Fischer-Frühholz, GIT Labor-Fachzeitschrift June 2004, pages 603-605, GIT-Verlag GmbH & Co. KG, Darmstadt, available on the Internet at http://microsite.sartorius.com/en/biotechnology/laboratory/products_applications/membrane_adsorbers/literature/pdfs/Fischer-F_2004_MA_Aufreinigung_in_neuen_Dimensionen.pdf, gives some indications as to which ranges of substance mixture quantities or flow rates are more likely to be assigned to analysis and which ranges of quantities or flow rates are more likely to be assigned to production. In principle, however, quantities of less than one liter typically fall under laboratory scale, regardless of the specific field of application (vaccines, antibodies, etc.).

The invention is based on the findings that, using suitable measures, large-volume membrane chromatography processes can be carried out in a simple and yet variable manner. Membrane chromatography is for polishing applications (removal in particular of viruses, DNA and host cell protein). Further typical applications include concentration, purification and desalting of peptides, flow-to-waste and analyte collection, protein purification and sample preparation. A more recent field of application is virus purification in vaccine production. Thin, synthetic, porous membranes which may be single-layer or multilayer are used in the membrane chromatography modules of the single-use device according to the invention. The surfaces of the membranes can be modified in a known manner, e.g., with ligands, to be able to bind specific molecules. The membranes may also be formed from nonwoven materials (fiber layers), which are also modified.

Due to the plurality of membrane chromatography modules, which are firmly mounted in a predetermined grid, but which are preconfigured or adapted to be preconfigured with regard to the type of membrane chromatography modules and the connections of the lines, the single-use device according to the invention can be used to implement special, individually designed processes on a production scale with a relatively small space requirement for the single-use device. Due to the predefined grid for the modules, the preferably rigid lines of the line system can be very short, so that the material and assembly costs are minimized. The lines may be configured such that only comparatively small dead volumes remain. In a line arrangement by means of which the flow to the membrane chromatography modules is realized in parallel (parallelization), a uniform flow thereto can in particular be ensured (this will be discussed in more detail later). When changing buffers, comparatively little backmixing is to be expected, so that a smaller quantity of rinsing medium is sufficient after cleaning, for example.

After being equipped with the membrane chromatography modules and the connections thereof, the single-use device having a modular structure can be hermetically packaged as a whole and then pre-sterilized (in particular by gamma or superheated steam sterilization) so that it can be put into operation immediately after delivery to the user without having to add or fix any components.

Preferably, at least some of the membrane chromatography modules are configured as spiral-wound modules due to their high packing density and the variety of possible combinations. In particular, they offer the possibility to scale up processes easily by parallelization.

In an advantageous embodiment of the single-use device according to the invention, it is of particular importance that it has at least two separate inlets and preferably also a plurality of outlets which are assigned to different media. This makes it possible to feed the modules with different media without great effort, which is particularly advantageous with regard to the process steps of equilibration/ washing, loading and elution. Due to the plurality of separate inlets and outlets, the lines connected to the modules no longer need to be flushed. Buffers can enter the modules directly. No hoses and/or plastic flanges with a valve block need to be connected upstream. The inlets or outlets may be provided with a connector, which in turn can be connected directly to a buffer tank. An alternating connection or disconnection is no longer necessary. All these advantages lead to a minimization of risks, in particular with regard to faulty feeding and undesired mixing or contamination of the media.

In principle, the membrane chromatography modules themselves may also have at least two separate inlets and preferably also a plurality of outlets. Such a design of the modules can be particularly advantageous when the modules are connected in series.

According to a preferred embodiment of the single-use device according to the invention, a prefilter is arranged upstream of at least one membrane chromatography module, in particular a spiral-wound module, the prefilter preferably comprising a pleated filter element. Such a prefilter serves to remove aggregates or clumps. A pore size of about 0.45 $\mu$m is recommended.

At least some of the lines of the line system are preferably designed as rigid lines. The rigid lines, in particular a rigid common inlet line and/or a rigid common outlet line for several membrane chromatography modules of the single-use device, may be configured as pressure-stable tubes having a defined diameter. This means that the diameter is not arbitrarily chosen and does not vary during operation as a result of material expansion or the like. This results in a uniform pressure distribution and a uniform flow velocity of the medium when the membrane chromatography modules are hit by a flow, which is particularly advantageous when using chromatography gels. This is not readily achievable when the membrane chromatography modules are connected using (thin) hoses, as there would typically be different hose lengths and different hose diameters, the constancy of which cannot be ensured during operation, especially at high and varying pressure.

The choice of the specific diameter of a rigid pipe for a single-use device according to the invention is based on the following findings and considerations: Typical flow rates of adsorbers and a maximum flow velocity of 2.5 m/s (recommended to keep pressure drop and shear forces small) are taken as a basis. Putting the free cross-sectional area of a feed line in relation to the adsorber volume, it follows that the free cross-sectional area should be at least 1.5 cm$^2$ per liter of membrane volume, preferably at least 2 cm$^2$/L. In view of avoiding unnecessary dead volume, the value should not be greater than 5 cm$^2$/L. A suitable diameter for the pipe may then be determined from these specifications.

In general, rigid pipes are more robust, pressure-resistant and safer compared to hose lines, i.e. the failure safety is higher. A process can be carried out faster as higher operating pressures are possible.

In addition, the use of rigid distributing pipes has the advantage that a common flow volume results in flow calming and that pressure surges are reduced.

Depending on the type and requirements of the process to be carried out with the single-use device according to the invention, the membrane chromatography modules can be arranged (switched) in different ways. In principle, modes of operation are possible in which (i) the flow to some, preferably all, of the membrane chromatography modules is parallel (hereinafter referred to as parallelization), (ii) the flow to at least one group of modules is parallel to another group of modules, while the flow to the modules within the groups is sequential, or (iii) the flow to all membrane chromatography modules is sequential.

With regard to the evaluation of the measurement results, it is important in the case of parallelization (operating mode (i)) that the flow paths through the individual membrane chromatography modules are of equal total length (path from the inflow port through the module 1 to the outflow port=path from the inflow port through the module 2 to the outflow port, etc.). If, for example, the path from the inflow port to the inlet of the module is short for the first module and long for the second module, the path from the outlet to the outflow port must accordingly be long for the first module and short for the second module. This is the only way to achieve sharply delimited elution peaks with a narrow width. In this way, premature overloading of a module is avoided in the feeding step.

The operating modes (ii) and (iii) have the advantage that in the event of a membrane rupture in one of the membrane chromatography modules, the protein can be collected by the subsequent membrane chromatography module. In principle, this advantage applies to all modes of operation in which at least some modules are sequentially connected. The overall capacity of the single-use device is accordingly better utilized.

According to a particular aspect of the invention, automated valves controlled by a control unit are provided at a plurality of points in the lines of the line system. At these points, the flow of the medium passing therethrough can be selectively released or interrupted to realize different flow paths during a process.

Additional inlets and outlets are preferably located at the points in the line system where the valves are arranged. This makes it easy to feed a membrane chromatography module or a module group individually with the respectively appropriate buffer medium.

With regard to a bind/elute (B/E) operation of the single-use device according to the invention, it is useful to arrange at least one single-use conductivity sensor and/or one pH sensor and/or one single-use UV sensor upstream of an inlet and/or downstream of an outlet of a membrane chromatography module or a group of interconnected membrane chromatography modules. Arranging the sensor system both upstream and downstream of a membrane chromatography module or a group of modules allows inlet and outlet values of the measured parameters to be compared with each other and thus, for example, a membrane rupture to be detected. When using a more sophisticated sensor system or spectrometers (Raman, FT-IR, UV, fluorescence), the composition of the mixture of substances can be analyzed upstream the inlet and/or downstream the outlet of a membrane chromatography module or a group of membrane chromatography modules.

Furthermore, with respect to parameter-dependent control of the operation of the single-use device according to the invention, at least one single-use pressure sensor and/or one single-use flow sensor may be arranged in one of the lines of the line system. For example, an optimal flow rate can be determined in a preliminary test on a small scale. During actual operation of the single-use device, control or regulation can then be performed with the optimum flow rate as the setpoint using the measured values from the sensors. In addition, pressure sensors may serve to detect overpressure in the system so that an emergency shutdown can be initiated immediately. If the single-use device according to the invention is used in a continuously conducted method, in which a further process step takes place after or before chromatography, it is important to know the flow rates and, if necessary, to set them to suitable values. For example, the volume flow rate may be adapted to upstream or downstream steps.

A particularly advantageous embodiment of the single-use device according to the invention results from the fact that the sensor(s) is/are connected to the control unit which also controls the automated valves. With such a setup, automated control of the single-use device as a function of the measured operating parameters is possible without manual intervention. Automated control of the valves also allows multiple processes or sub-processes to be performed simultaneously by switching the valves so that the lines form separate, independent line branches with associated membrane chromatography modules.

As already indicated, the single-use device according to the invention, in the assembled state, can form a closed and pre-sterilized unit which can be stored and transported as a whole. This makes it possible to deliver the single-use device with membrane chromatography modules already equilibrated in buffer medium. The user is thus not required to perform additional process steps, and potential errors on the part of the user are avoided. The modules can also contain a storage medium, in particular ethanol. This lowers the extractable-and-leachable level, as they are already pre-extracted in the ethanol. It is also possible to already rinse the modules before storing them in ethanol, thereby lowering the extractable-and-leachable level. Rinsing before delivery also makes it possible to perform an integrity test already at the manufacturer. Any medium possibly contained in the modules for stabilizing the membranes, in particular glycerol, is then also already rinsed out when the single-use device is delivered. Thus, filling precedes the rinsing step.

With regard to emptying and venting of the membrane chromatography modules used in the single-use device according to the invention, it is desirable that the membrane chromatography modules stand upright in their position of use, which can be made possible, for example, by a rigid support of the single-use device. If all membrane chromatography modules of the device are in an upright position, a central air filter can optionally be provided for venting the entire unit of membrane chromatography modules. This means that the venting of all membrane chromatography modules can be performed at a single location. Furthermore, when all membrane chromatography modules are in an upright position, it is possible to empty them in their entirety at a lowest point. A central collecting device for emptying may be arranged at this point.

A particular aspect of the invention, which is basically independent of the type of modules used (here membrane chromatography modules), is the provision of a cover means and/or a bottom means attached to the upper side or lower side, respectively, of a plurality of membrane chromatography modules. The cover means and/or bottom means has a dual function. On the one hand, it holds the membrane chromatography modules in position in a predetermined grid. On the other hand, at least part of a line system of the single-use device is formed in the cover device, with connecting lines between the membrane chromatography modules. This further reduces the space requirement of the single-use device, as separate hose or pipe lines can be dispensed with in this respect.

According to a particular configuration of the cover means and/or the bottom means, the latter has individual, firmly interconnected segments, each of which is assigned to one membrane chromatography module.

In addition, the cover means and/or the bottom means, in particular the segments thereof, have individually preconfigured or preconfigurable ports and line sections. Therefore, an individually configured line system can be created from individual segments in the manner of a modular system, in which each membrane chromatography module is integrated into the flow path(s) in the desired manner. If configured appropriately, no additional/external fluid distribution or valves are required. Rather, all required media can be connected directly and controlled directly by the control unit via the automated valves. Therefore, otherwise required additional hoses, valves, etc. may be omitted. By defining assigned ports for each process medium in advance, the risk of confusion is significantly reduced.

One or more sensors or spectroscopic means can be attached directly to one or more otherwise unused ports of the cover means or bottom means. No additional line is required therefor, so that a very compact structure is obtained.

According to a basic alternative of the invention, the chromatography modules of the single-use device according to the invention may be filled with a chromatography gel or a monolithic chromatography material instead of a chromatography membrane. In particular, all or some of the modules may contain a highly crosslinked, porous polymethylmethacrylate material having a well-defined channel size distribution. The high surface accessibility of the binding sites allows for capacities which exceed those of resin-based columns and enable rapid mass transfer on a convection basis. Such modules are characterized by their flow-independent performance, low backpressure, and versatility, which can contribute to faster separation, concentration, cleaning, removal, and analysis of biological materials. Monolithic chromatography material is particularly suited to the demanding requirements in the purification of very large biomolecules such as virus particles, vesicles, proteins, RNA, plasmids and other forms of DNA.

In particular, as indicated above, the provision of the cover means and/or bottom means described above is in principle independent of whether the single-use device comprises membrane chromatography modules, chromatography modules filled with a gel or a monolithic material, or generally single-use filter units, in particular filter capsules.

The invention also provides a method of separating or purifying a large volume of a mixture of substances using a single-use device according to the invention, wherein the single-use device comprises a plurality of automated valves and sensors, in particular at least one single-use conductivity sensor, a single-use UV sensor, a single-use pressure sensor or a single-use flow sensor, connected to a control unit. The method according to the invention provides that the automated valves are controlled based on an evaluation of the operating parameters measured by the sensors. The automated control of the valves is particularly advantageous in the bind/elute mode due to the changing process steps.

Signal threshold values can be defined in advance for the operating parameters measured by the sensors, so that specified process steps are carried out depending on an exceeding or dropping below the signal threshold values, e.g. an automatically executed valve switching sequence for collecting selected and separated fractions.

BRIEF DESCRIPTION OF THE DRAWINGS

Further features and advantages of the invention will become apparent from the description below and from the accompanying drawings, to which reference is made and in which.

DETAILED DESCRIPTION

Figure 1:
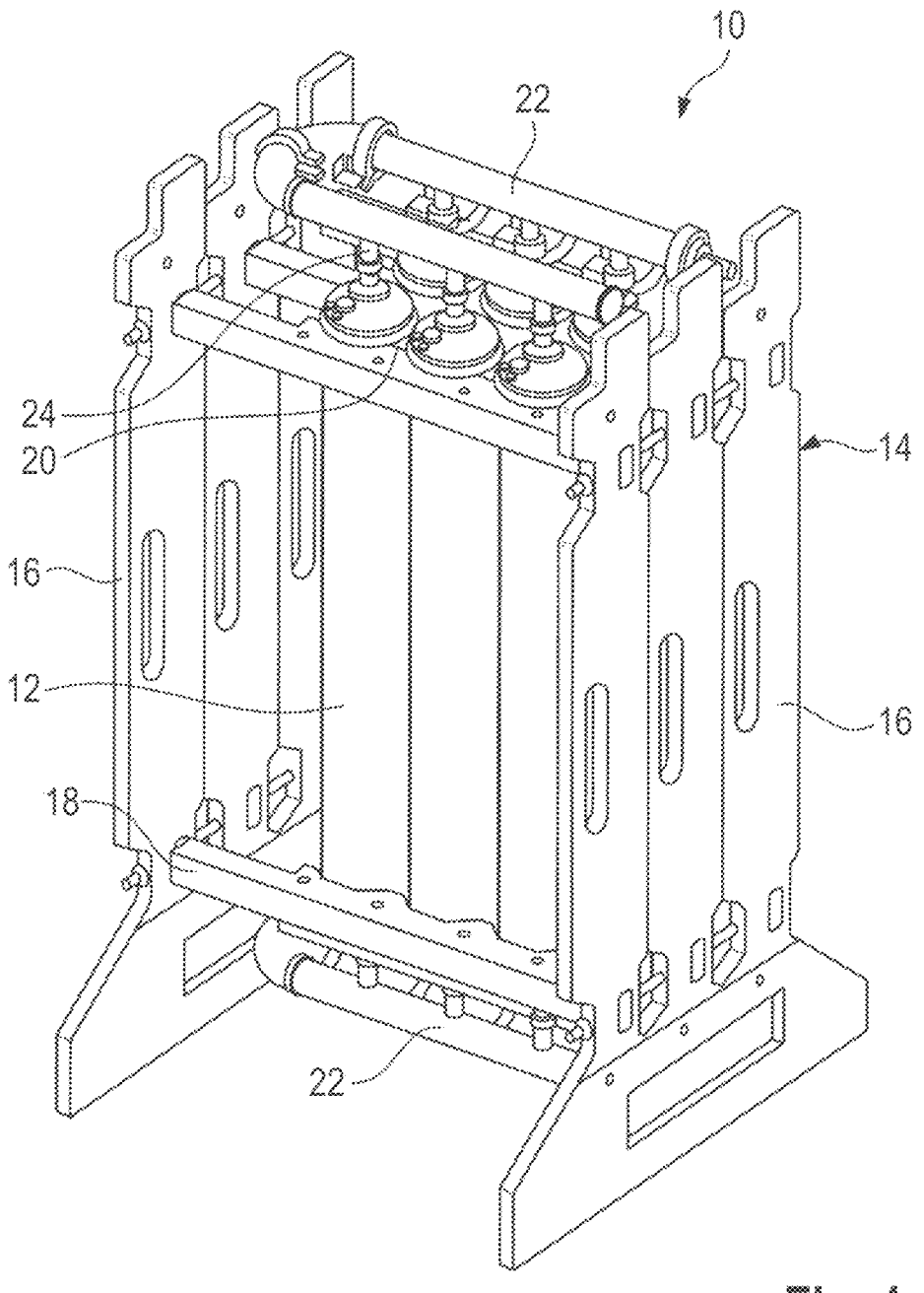
FIG. 1 shows a perspective view of a single-use device according to the invention in a first embodiment.

FIG. 1 shows a single-use device 10 for separating or purifying a large volume of a mixture of substances, which is described in more detail below. Subsequently, possible modifications of the device are explained, in particular with regard to the preferred configuration as a membrane chromatography device.

The single-use device 10 comprises a plurality of membrane chromatography modules 12. The membrane chromatography modules 12 are held in an upright position by a rigid holder 14 (rack) in a predetermined arrangement (grid). In the example embodiment shown in FIG. 1, six membrane chromatography modules 12 are arranged upright in a 3×2 grid. Of course, other grids including more or fewer membrane chromatography modules 12 are also possible, arrangements that are as compact as possible being preferred. The holder 14 comprises at least two opposite side walls 16, which are connected to each other by cross struts 18. Holding means 20 for the individual membrane chromatography modules 12 are provided on the cross struts 18. The holding means 20 are provided with elastic materials. This provides shock and vibration damping for the membrane chromatography modules 12 both during transport and during operation of the single-use device 10.

The membrane chromatography modules 12 are fully or at least largely interconnected by rigid, pressure-stable pipes 22. The rigid pipes 22 ensure uniform flow behavior without pressure fluctuations. The course of the pipes 22 is determined by the intended operation of the single-use device 10. FIG. 1 shows a complete parallel connection of six membrane chromatography modules 12. However, a partial parallel connection or a complete or partial series connection of the membrane chromatography modules 12 may also be provided. The pipes 22 have the branches 24 necessary therefor to the individual membrane chromatography modules 12. Where necessary, the pipes 22 are attached to the holder 14.

Figure 2:
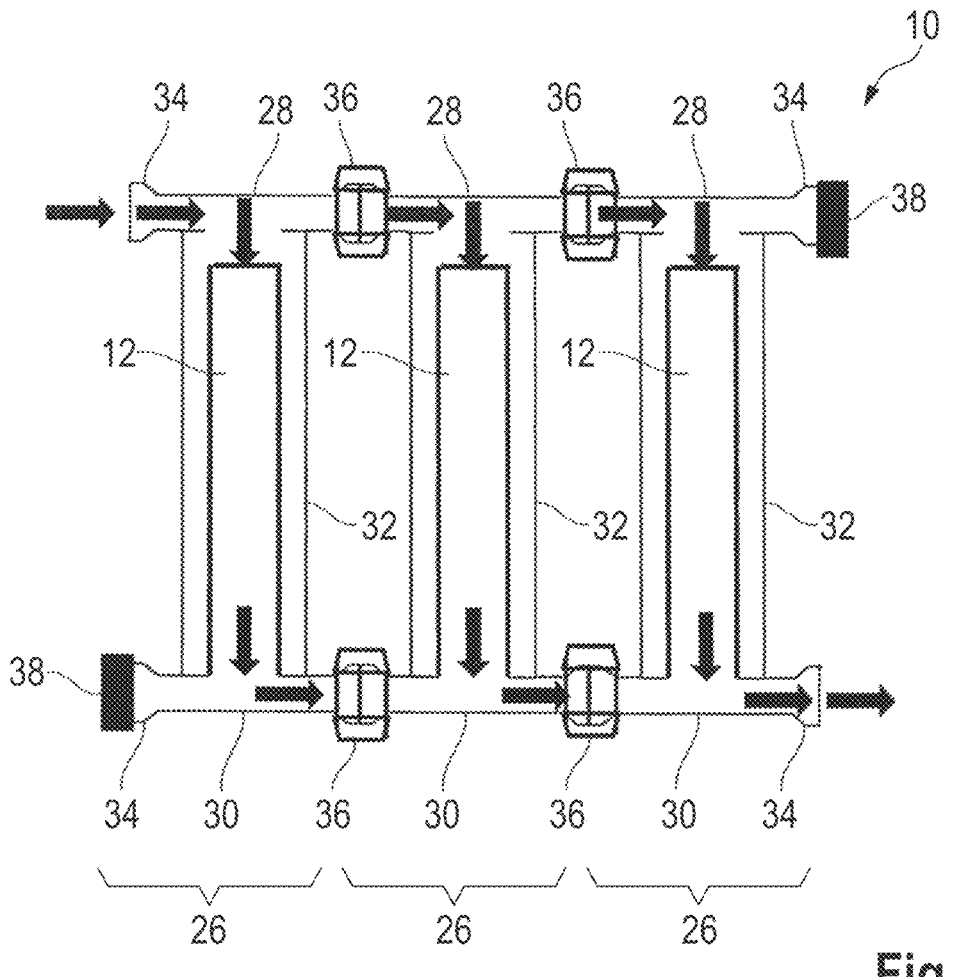
FIG. 2 shows a schematic representation of a single-use device according to the invention in a second embodiment without a holder.

FIG. 2 schematically shows a further embodiment of the single-use device 10 according to the invention, but without the associated holder 14. The special feature of this embodiment is the piping of the membrane chromatography modules 12. Instead of the pipes 22 and branches 24, rigid, standardized inlet and outlet units 26 made of plastic are provided here. One individual inlet and outlet unit 26 having an inlet means 28 and an outlet means 30 is provided for each membrane chromatography module 12, which are adapted to the inlet and outlet ports on the end faces of the respective membrane chromatography module 12. The inlet means 28 and the outlet means 30 are either completely identical or at least largely identical in structure.

Connecting struts or a housing wall 32 extend between the inlet means 28 and the outlet means 30 to connect the two means to each other. In the latter case, the membrane chromatography modules 12 are surrounded by the completely circumferential housing wall 32 and are thus protected against external influences.

Both the inlet means 28 and the outlet means 30 each have two opposite external ports 34. By means of suitable connection components 36, such as TRI-clamp connections, several inlet and outlet units 26 can be connected to each other. An inlet-side external port 34 of a membrane chromatography module 12 is connected to an inlet-side external port 34 of an adjacent membrane chromatography module 12. Similarly, an outlet-side external port 34 of one membrane chromatography module 12 is connected to an outlet-side external port 34 of an adjacent membrane chromatography module 12. In each case, seals are to be provided between the connections. In this way, any number of membrane chromatography modules 12 can be joined together for parallel inflow. The external ports 34 which are not necessary are sealed by suitable closures 38. These closures 38 or blind caps are also attached by means of suitable connection components 36.

The inlet and outlet unit 26 can be formed in one piece, as a kit or as a prefabricated unit. In particular, a plurality of inlet means 28 and/or outlet means 30 may be formed in one piece or pre-assembled before being attached to the membrane chromatography modules 12.

The membrane chromatography modules 12 are oriented so that flow passes therethrough from the bottom to the top, which provides uniform hydrostatic conditions. However, reverse operation is also possible, i.e. flow from the top to the bottom.

Shut-off valves can be provided between the membrane chromatography modules 12 so that connections between specific membrane chromatography modules 12 can be purposefully blocked. This allows for purposeful sterile venting of a single membrane chromatography module 12 or a group of interconnected membrane chromatography modules.

The shut-off valves can also be used for an integrity test, in which the adsorber membranes are wetted before any unwanted bypasses are detected with a test gas. The integrity test is performed in the membrane chromatography modules 12 in substantially the same manner as for filter capsules. By means of the shut-off valves and a common vent line having a sterile air filter, it is also possible to test a group of modules 12 together. The integrity test can be performed already before the single-use device 10 is delivered, so that the user is spared this effort.

The most important, preferably all valves required to operate the single-use device 10 are located on the same side of the single-use device 10, which creates an improved overview and simplified operability.

The valves, or at least part of them, as well as further means of the single-use device 10 can be automated, i.e. a programmable control unit (not shown) takes over the control of these components during a process or process step.

Measures for optimizing the single-use device 10 are described below. The membrane chromatography modules 12 are preferably multi-layered spiral-wound modules with a bed height of preferably 1 to 30 mm. For uniform flow therethrough, it is convenient to use membranes from the same batch for the modules.

The connections of the membrane chromatography modules 12 are preconfigured for a desired separation or purification process. Thus, different modes of operation can be realized by appropriately preconfigured line runs. In particular, the flow to the membrane chromatography modules 12 can be in series (sequentially) or in parallel. It is also possible that the flow to one or more groups (banks, blocks) of membrane chromatography modules 12 is in parallel, while the flow to the modules 12 within a group is sequential. Due to the predefined grid, the flexible hose or the rigid pipe connection lines can be very short, so that the material and assembly costs, but also dead spaces, i.e. areas without any function, are minimized.

The membrane chromatography modules 12 of the single-use device 10 are all connected to each other by a common inlet line and a common outlet line, if necessary with branches for parallel operation of the modules. The lines are optimized for dead space in that they have a maximum diameter adapted to maximum flow velocity and a minimum length required for distribution or merging. The line diameters are also kept as small as possible to prevent backmixing.

Furthermore, at least one common discharge line optimized for dead space is provided for the entire single-use device 10, through which medium to be disposed of can be discharged. However, a cover means and a bottom means for the membrane chromatography modules 12 having a plurality of inlets and outlets are preferred, which will be described in more detail later.

Due to the compact, dead-space-optimized design of the single-use device 10, the required volume of the process media is reduced to a minimum, so that, on the one hand, costs and the effort for subsequent reprocessing steps, which are necessary due to the use of different process media, are reduced.

The membrane chromatography modules 12 used in the single-use device 10 can be of different types. This relates in particular to the types of membrane adsorbers used in the modules 12.

A prefilter, for example in the form of a filter capsule, may be integrated into an inlet line leading to one or more membrane chromatography modules 12. The effective filter area of the prefilter is significantly smaller than that of the associated membrane chromatography module(s) 12.

The single-use device 10 has at least one, preferably at least two outlets and preferably at least two inlets. Thus, the modules 12 can be operated with at least two, possibly even with three or more different media, which are alternately or separately supplied/discharged (equilibration/washing, loading and elution).

The inlets or outlets are each provided with single-use valves (which can be designed as multi-way valves), as are the common inlet line and the common outlet line, and, where required, any other connecting lines. The valves are preferably automated, i.e., the valves are connected to the control unit of the single-use device 10, which can enable and block the corresponding inlets, outlets, or lines. Due to the automated valves, different modes of operation can be implemented without having to modify the single-use device 10, particularly with regard to optionally sequential or parallel flowing to the membrane chromatography modules 12 or module groups.

Due to the flexible interconnection, the capacity of the adsorbers in the membrane chromatography modules can also be better utilized. In a serial connection, a downstream second membrane chromatography module 12 can accommodate the rupture of an upstream first module 12 in the event of overloading. When the first module 12 is full, it is eluted/cleaned. In the meantime, the second module 12 can optionally be further loaded. The first module 12 is then connected downstream after regeneration.

A sequential flow through the membrane chromatography modules 12 makes it possible to link different process steps together, in particular different types of chromatography.

By means of additional inlets and outlets at the interruption points in the connecting lines—i.e. where valves are arranged—individual feeding with a buffer medium required for the respective membrane chromatography module 12 or for the respective module group is possible. This is particularly relevant in the case of an interconnection of successive membrane chromatography modules 12 having different membrane adsorber types.

Figure 3:
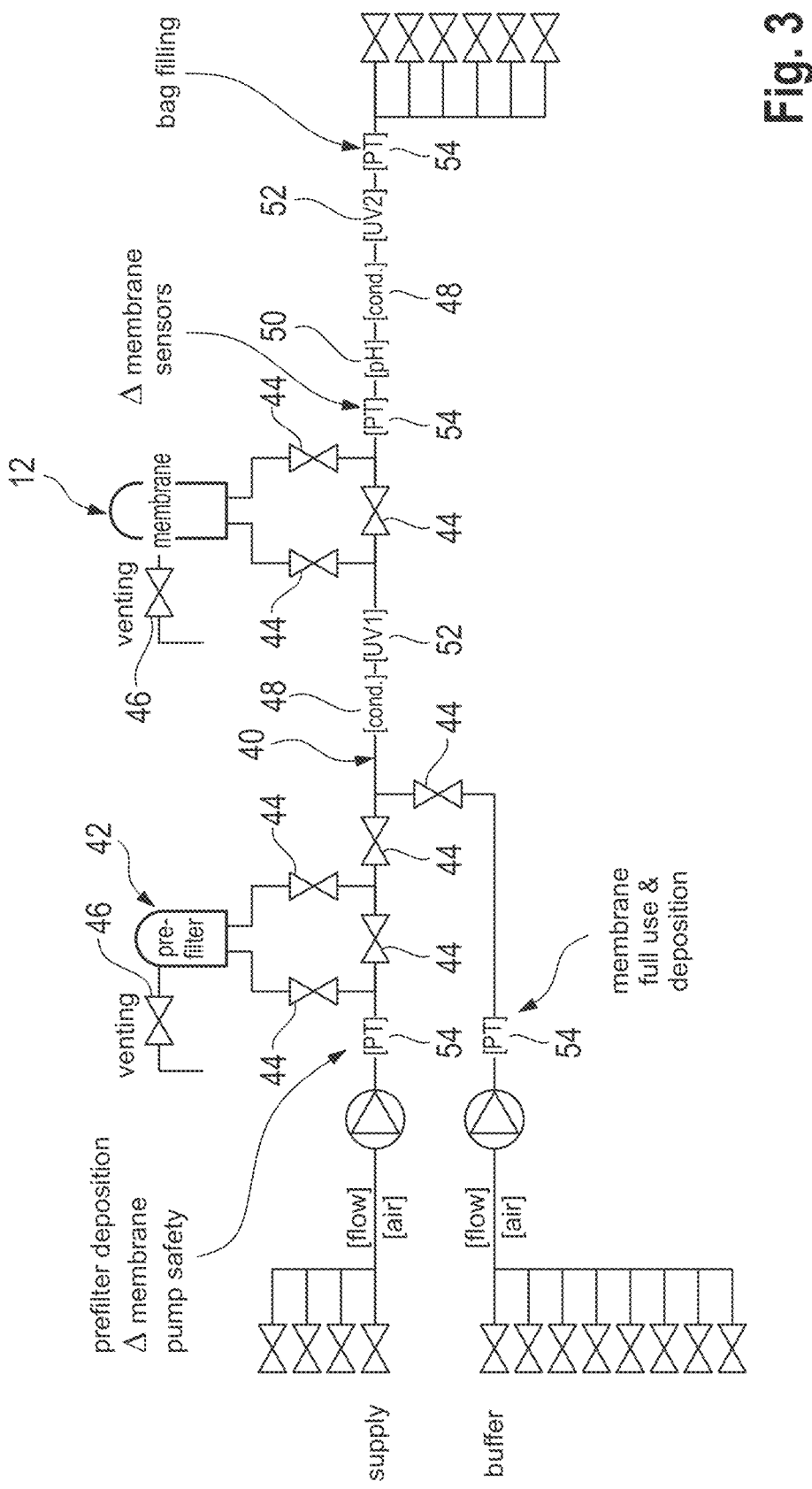
FIG. 3 shows a schematic arrangement of components of a single-use device according to the invention.

An exemplary arrangement of components of a single-use device 10 according to the invention is shown in FIG. 3. A mixture of substances to be separated or purified and one or more buffers can be supplied to one or more membrane chromatography modules 12 via a feed line 40. The membrane chromatography modules 12 may have further inlets, e.g. for separate supply of a rinsing medium.

Before being supplied to the membrane chromatography modules 12, the mixture of substances flows through a prefilter 42. After passing through the membrane chromatography modules 12, the medium or buffers are filled into bags.

By means of a plurality of valves 44, different flow paths can be set depending on the respective operating mode of the single-use device 10 (rinsing, flow-through, bind/elute, integrity test, washing, sanitizing, cleaning). The prefilter 42 and the membrane chromatography modules 12 can be vented via a vent valve 46.

Particularly with respect to the operation of the single-use device 10 in the bind/elute mode, at least one single-use conductivity sensor 48 and/or one single-use pH sensor 50 and/or one single-use UV sensor 52 is provided. The sensor (s) 48, 50, 52 is/are arranged downstream of the outlets of the membrane chromatography module 12 or the prefilter 42 of the single-use device 10. In the case of a series connection of membrane chromatography modules 12, the sensor(s) 48, 50, 52 is/are arranged after the last process step, optionally also before the first process step and/or between individual process steps.

Furthermore, pressure sensors 54 and/or flow sensors, which are connected to the control unit of the single-use device 10 in the same way as the single-use conductivity sensor(s) 48, the single-use pH sensor(s) 50 and/or the single-use UV sensor(s) 52 are arranged in the lines at critical points in the line system.

Thus, a continuous measurement of operating parameters and an automated control of the single-use device 10 depending on these parameters is possible.

The single-use device 10 having the membrane chromatography modules 12 is adapted to be operated in the flow-through mode (FT), but particularly preferably in the bind/elute mode (B/E). In the B/E mode, automated valve switching operations and an automated regulation based on measured values of sensors are particularly advantageous due to the changing process steps.

By defining certain signal threshold values of the sensors 48, 50, 52, the valve switching sequence for collecting selected and separated fractions can be automated in the FT or B/E mode 12 (autosampling).

The single-use device 10 can also be used to perform a plurality of processes or subprocesses simultaneously. For such cases, it is provided that the lines form at least two separate, independent line branches with associated membrane chromatography modules 12.

Due to the valves integrated in the lines, such independent line branches can be created in a flexible way. In conjunction with the additional inlets and outlets and pH and/or conductivity and/or UV sensors arranged there, a quasi-continuous mode of operation is possible by operating at least two parallel systems or system groups, one in a loading mode, the respective other in the elution mode. By additional serial interconnection, a plurality of purification steps can be arranged in continuous operation using pre-sterilized, pre-assembled, sterile or non-sterile installable systems (seamless loading after elution is complete).

The entire single-use device 10 is adapted to be transported in a sealed and pre-sterilized state when assembled. This offers the possibility to deliver the membrane chromatography modules 12 equilibrated in buffer medium or loaded with product solution. An integrity test can also be carried out before delivery. This saves the user lengthy preparatory steps.

FIGS. 4 to 9 show a plurality of membrane chromatography modules 12 of a single-use device 10 in different operating modes. A special feature here is the rigid single-use cover means 56 and the rigid single-use bottom means 58. These means 56, 58 replace the holder 14 and alone hold the membrane chromatography modules 12 in position in the predefined arrangement (grid). The cover means 56 and the bottom means 58 may be formed in one piece or may be composed of individual elements that are firmly connected to each other. In either case, the cover means 56 and the bottom means 58 are divided into individual segments 60, each of which is associated with a membrane chromatography module 12.

The cover means 56 and the bottom means 58, more specifically each segment 60, includes ports 62 and line sections 64 which are individually preconfigured or adapted to be preconfigured. The ports 62 and line sections 64 of a segment 60 are in flow communication with inlets or outlets of the associated membrane chromatography module 12 and the ports of adjacent segments 60, or not (depending on the configuration). The number of ports 62 per segment 60 is variable, and the ports 62 can in principle be occupied or blocked in any way. The line sections 64 can also be arranged across segments.

Sensors 48, 50, 52, 52, 54 and/or spectroscopic means can be attached, in particular plugged, to the cover means 56 and/or to the bottom means 58, more precisely to otherwise unused ports 62.

With the cover means 56 and the bottom means 58, it is possible, by an appropriate configuration, to ensure an equal distribution of fluid with respect to the inlets of one or a group of membrane chromatography modules 12 for the mixture of substances (product inlet) and for the elution buffer (buffer inlet), i.e. the respective flow paths to the corresponding outlet are of equal length. This results in narrow, clearly discernible peaks in the spectrum (high resolution).

As already mentioned, the single-use device 10 can be operated in the flow-through mode (FT) or in the bind/elute mode (B/E). The operation of the single-use device 10 with the cover means 56 and the bottom means 58 in the B/E mode will be described in the following.

Figure 4:
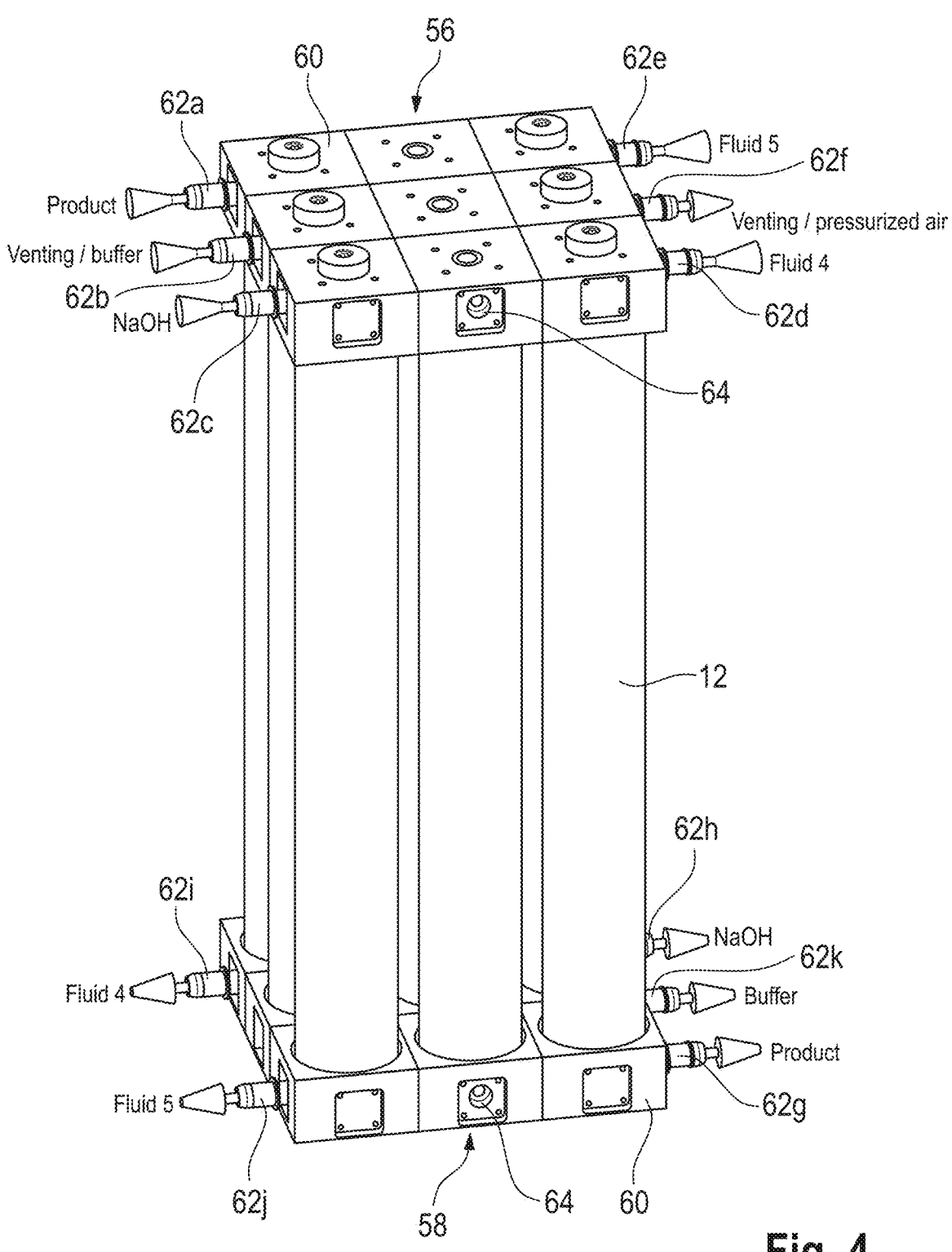
FIG. 4 shows a perspective view of a further single-use device according to the invention in a third embodiment with a cover means and a bottom means.

FIG. 4 shows the use of the individual ports 62a to 62k of the segments 60 for operation in the B/E mode:

A conditioned product flow (pH, conductivity, etc. adjusted in advance by buffers) is supplied via the inlet port 62a labeled "Product".

The inlet port 62b labeled "Venting/Buffer" is available in the FT mode for venting the membrane chromatography modules 12. In the B/E mode, it is used to supply a conditioning buffer, for example for load adjustment for ion exchange chromatography or similar).

A sodium hydroxide solution for cleaning the adsorber membranes of the membrane chromatography modules 12 is supplied via the inlet port 62c labeled "NaOH".

The inlet port 62d labeled "Fluid 4" is used to supply an elution buffer.

The inlet port 62e labeled "Fluid 5" allows the supply of an equilibration buffer and/or a wash buffer.

A venting can be carried out in the B/E mode via the outlet port 62f labeled "Venting/Pressurized air".

The supplied product flow is discharged via the outlet port 62g labeled "Product".

The outlet ports 62h, 62i, 62j, 62k labeled "NaOH", "Fluid 4", "Fluid 5" and "Buffer" are used to discharge the corresponding media. At least the media NaOH, Fluid 5, and buffer could also all be directed to one of the aforementioned outlet ports 62h, 62j, 62k so that a common waste bag can be used for disposal.

Typically, the following process steps take place during the B/E operation:

1. Filling and venting, typically using a buffer, to wet the membrane chromatography modules 12 with liquid.
2. Optional integrity test.
3. Sanitizing, typically using a caustic solution, to reduce the germ load (bioburden) before first use.
4a. Conditioning (optional) using a buffer, especially a high salt buffer, to bring all ligands and binding sites to the same level (stationary phase).
4b. Alternatively to 4a: Rinsing using buffer to remove caustic solution.
5. Equilibrating using a buffer (different if necessary) to adjust the column equilibrium so that the ligands can bind.
6. Loading with target molecules.

7. At least one washing step, preferably using the equilibration buffer, to remove unbound protein residues or bound impurities.

8. Elution using an elution buffer to remove the protein from the columns.

9. Washing using a buffer to remove residues and impurities.

10a. Optional cleaning using acid or base to remove residues and impurities from the matrix. Reuse of the device 10 after conditioning or washing of the membrane chromatography modules 12 in the same batch (intra-batch re-use).

10b. Alternatively to 10a: Preserving the membrane chromatography modules 12 in a storage solution (e.g. ethanol). Reuse of the device 10 after sanitizing or conditioning or washing of the membrane chromatography modules 12 in the same batch (intra-batch re-use).

10c. Alternatively to 10a and 10b: discarding the membrane chromatography modules 12, no re-use.

Of course, this typical process can be varied depending on the method and requirements, in particular with respect to the order of the steps and the number of the intermediate steps. For example, multiple washing steps may occur, and/or the elution step may be repeated using a different elution buffer, etc.

Some details as to the use of the cover means 56 and the bottom means 58 in certain process steps in the B/E mode are described below.

Figure 5:
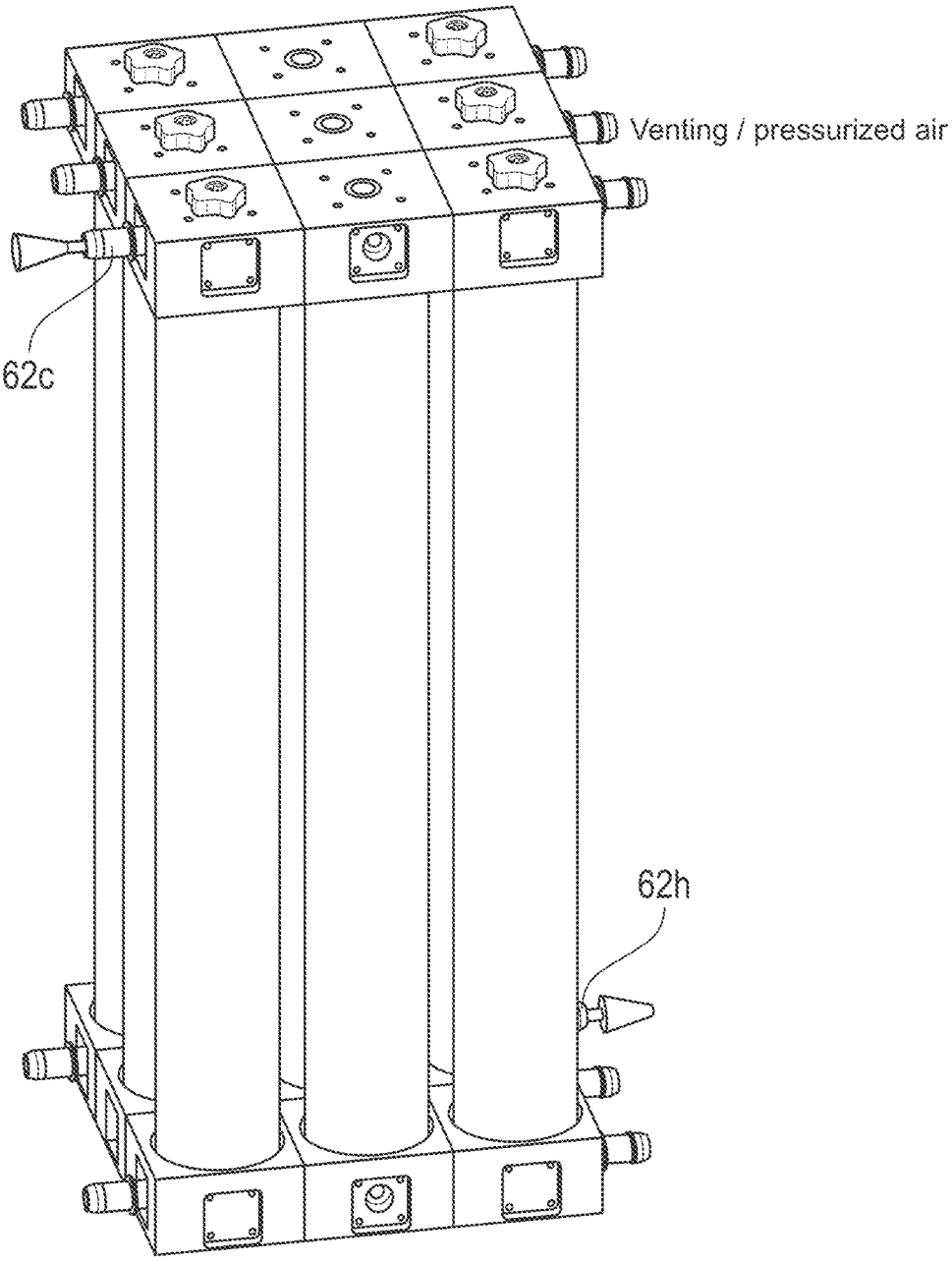
FIG. 5 shows the single-use device of FIG. 4 in a first mode of operation.

As shown in FIG. 5, for sanitizing the membrane chromatography modules 12 (a special cleaning and disinfection operation to significantly reduce the germ count), the system (combination of the membrane chromatography modules 12) is filled with a sodium hydroxide solution via the inlet port 62c of the cover means 56 labeled NaOH. The outlet port 62h of the bottom means 58 labeled NaOH initially remains closed to be able to vent the system via the outlet port 62f labeled "Venting/Pressurized air". The system is then sanitized using the flow-through method, the NaOH outlet port 62h being open. After a predetermined contact time has elapsed, the sodium hydroxide solution is pushed out of the system via the outlet port 62f while the inlet port 62c is closed. At the end, both the inlet port 62c and the outlet port 62f are closed again and the valves 44 are adjusted so that the membrane chromatography modules 12 are connected in parallel.

Figure 6:
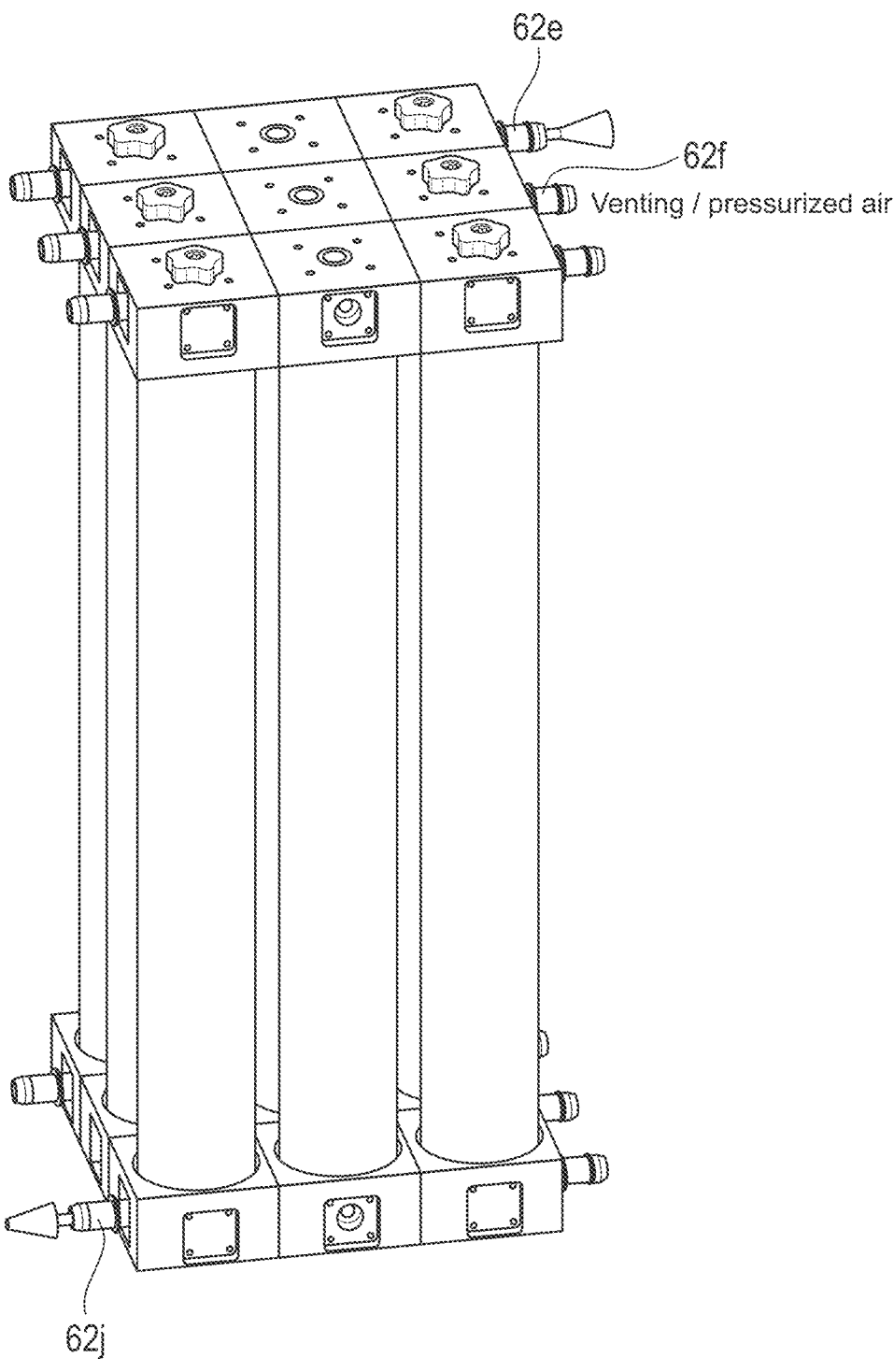
FIG. 6 shows the single-use device of FIG. 4 in a second mode of operation.

Prior to sanitization, the system is typically further flushed with a buffer, including venting. This optional step, shown in FIG. 6, is used for load adjustment, which is required in some ion exchange chromatography methods. For this purpose, the system is filled with a suitable buffer via the inlet port 62e labeled "Fluid 5". The outlet port initially remains closed to allow the system to be vented via the outlet port 62f labeled "Venting/Pressurized air". Subsequently, the system can optionally be conditioned using the through-flow method, the outlet port 62j being open. After a predetermined contact time has elapsed, both the inlet port 62e and the outlet port 62f are closed again and the valves 44 are adjusted so that the membrane chromatography modules 12 are connected in parallel. Pushing the buffer out of the system is usually not necessary if the subsequent equilibration step is performed using a similar buffer having a lower salt concentration (in particular CEX). Thus, there is no need for another venting. If it is nevertheless necessary to press out the buffer, it has to be proceeded in accordance with the sanitization step described above.

Figure 7:
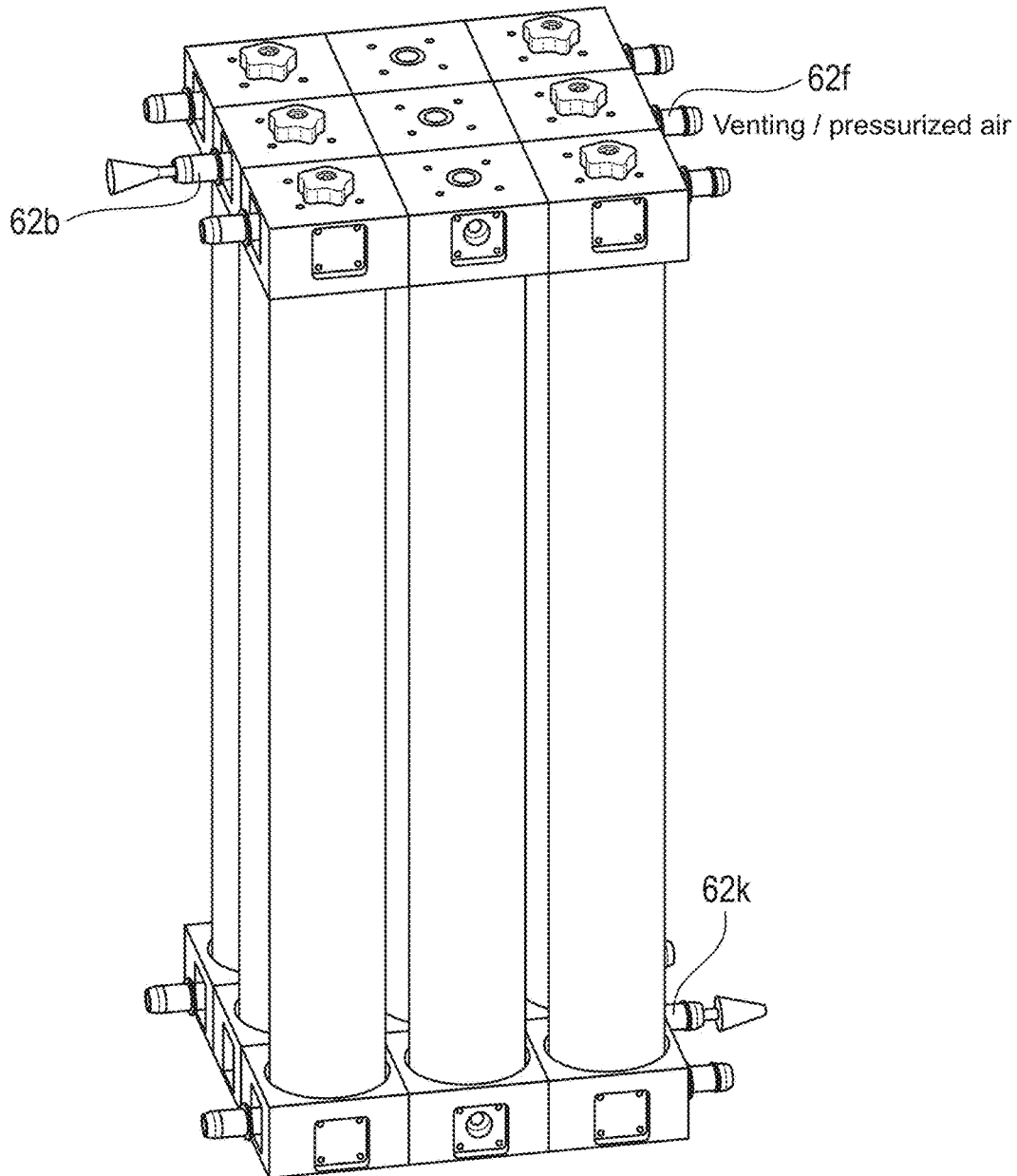
FIG. 7 shows the single-use device of FIG. 4 in a third mode of operation.

FIG. 7 shows the equilibration of the system using a buffer. The system is conditioned using a suitable buffer via the inlet port 62b labeled "Venting/Buffer" using the flow-through method, the outlet port 62k being open. After a predetermined contact time has elapsed, both the inlet port 62b and the outlet port 62k are closed again and the valves 44 are adjusted so that the membrane chromatography modules 12 are connected in parallel. Pushing the buffer out of the system is generally not required. Thus, there is no need for another venting. If it is nevertheless necessary to push out the buffer, it has to be proceeded in accordance with the sanitization step described above.

Figure 8:
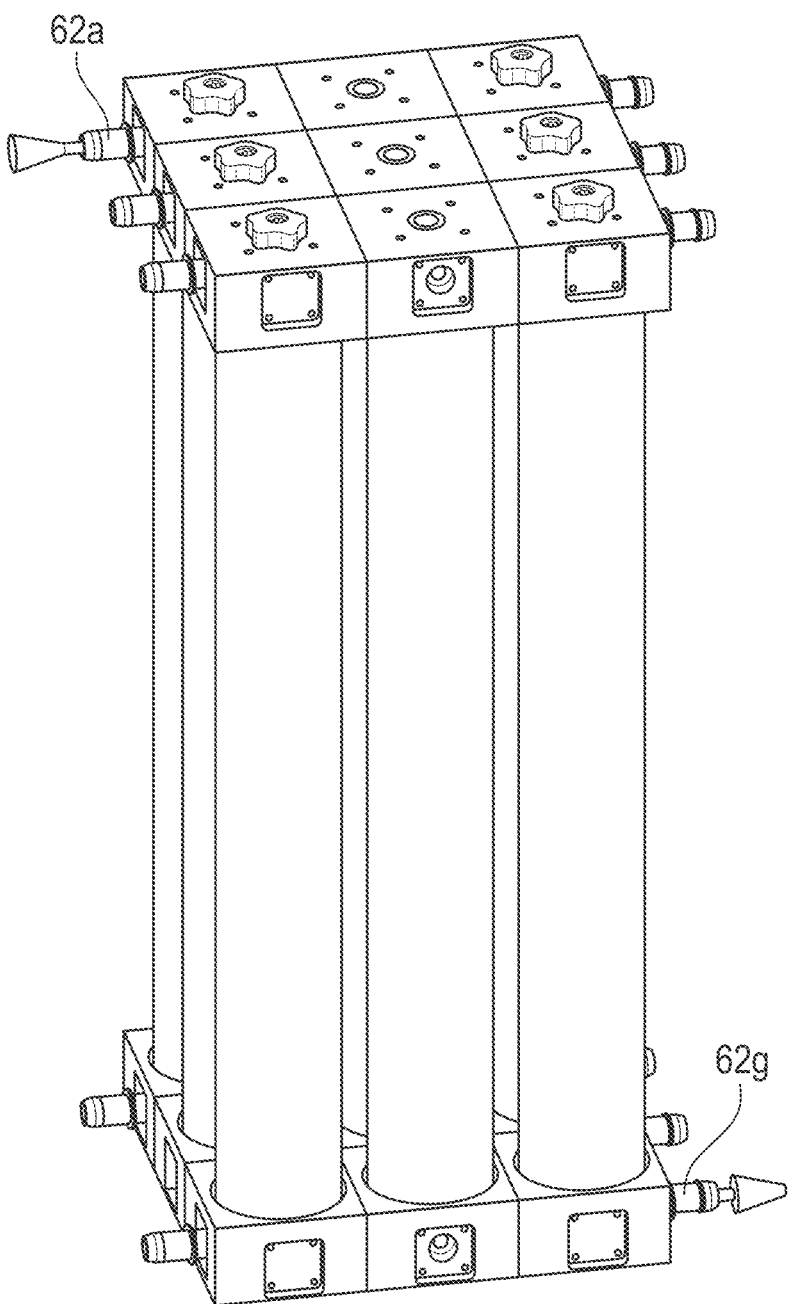
FIG. 8 shows the single-use device of FIG. 4 in a fourth mode of operation.

FIG. 8 shows the capture/load step for purifying the product solution. For this operation, the system is operated via the inlet port 62a labeled "Product". A flow is passed through the system, and the latter is loaded to a predetermined maximum amount (volume), which is sufficiently less than the known rupture amount (typically 70% of the 10% DBC value (dynamic binding capacity)). During this time, the product outlet port 62g remains open and the so-called flowthrough is discarded (alternatively, in the FT mode, the product would be collected in the flowthrough). The concentration of the product can optionally be determined by the sensors, in particular the UV sensors 52 and/or conductivity sensors 48, directly before the inflow and directly after the group of membrane chromatography modules 12 through which the flow passes.

As soon as the previously determined injection volume is reached, the control unit of the single-use device 10 switches to the next process step (elution). Prior to this, at least one washing step is performed to wash unspecifically bound material from the chromatography bed.

When the capacity of the system is reached, i.e. when the adsorber membranes have bound the predetermined maximum of target product to ligands (e.g. 70% of the 10% DBC value), the inlet port 62a and the outlet port 62g are closed.

A special feature of the embodiment shown in FIG. 4 is that the loading of the individual membrane chromatography modules 12 is synchronized during purification. This is achieved in that the inflow and outflow paths are S-shaped and arranged in mirror image to each other.

Figure 8A:
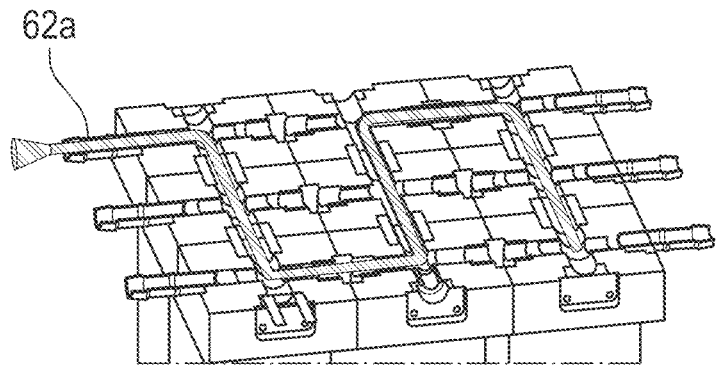
FIG. 8a shows the flow path through the cover means of the single-use device of FIG. 4 in the fourth mode of operation.

FIG. 8a shows the flow path through the cover means 56, which is referred to below as the inflow path. This inflow path runs such that in the 3×3 grid of the membrane chromatography modules 12, the flow initially flows to three modules 12 in an outer row, then via a first connecting path 66 to three modules 12 in the adjacent middle row and finally via a second connecting path 68 to the three remaining modules 12 in the opposite outer row. The two connecting paths 66, 68 are on opposite sides in the grid.

In each segment 60 of the cover means 56, a branch of the incident flow path is provided which opens into an upper inlet of the associated membrane chromatography module 12. Correspondingly, a lower outlet of the respective membrane chromatography module 12 opens into an outflow path formed in the bottom means 58.

As already mentioned, the course of the outflow path through the segments 60 of the bottom means 58 is mirror-inverted with respect to the course of the inflow path in the cover means 56. This means that—with respect to the direction of flow—the first membrane chromatography module 12 in the inflow path is also the first module 12 in the outflow path, the second membrane chromatography module 12 in the inflow path is also the second module 12 in the outflow path, and so on.

It is thus ensured that the path from the inflow port (here the inlet port 62a) through the first module 12 to the outflow port (here the outlet port 62*g*) has the same total length as the path from the inflow port through each of the other modules 12 to the outflow port. This is the precondition for obtaining distinct narrow peaks in the chromatogram.

Figure 9:
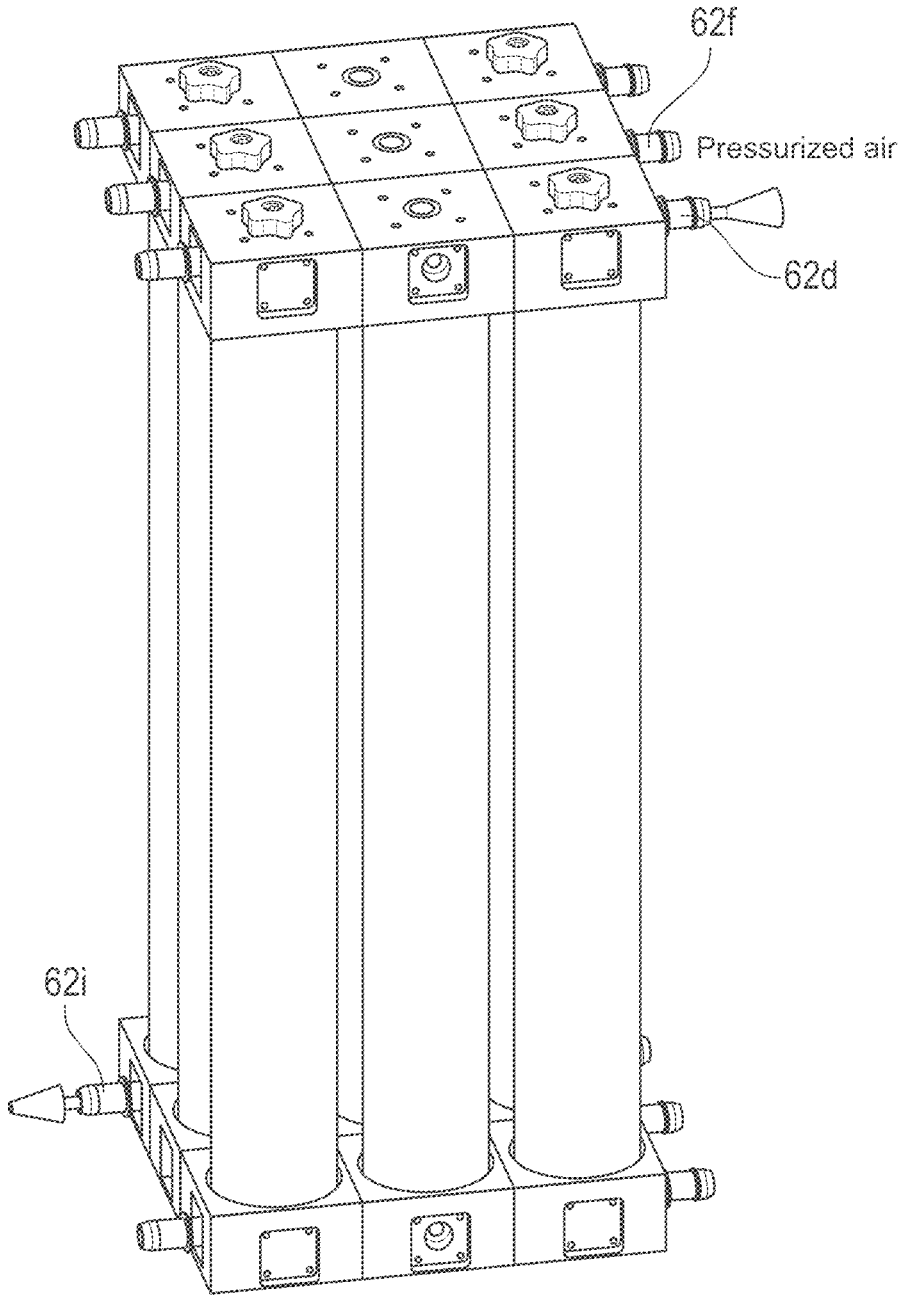
FIG. 9 shows the single-use device of FIG. 4 in a fifth mode of operation.

FIG. 9 shows the elution step for purifying the product solution. For this operation, the system is operated via the inlet port 62*d* labeled "Fluid 4". A flow is passed through the system, and elution of the target molecule into the mobile phase occurs as a result of buffering. During this time, the outlet port 62*i* remains open and the eluate (the discharged mixture of solvents and solutes) is collected in a product bag or other container (plastic barrel, stainless steel tank, or similar). The concentration of the product is determined by the sensors, in particular the UV sensors 52 and/or conductivity sensors 48 in the outflow path after the group of membrane chromatography modules 12 through which the flow passes. The elution is terminated as soon as the chromatogram has reached the baseline, i.e. when the concentration has dropped to about 0. No more buffer is then introduced. The buffer remaining in the system is pushed out via the outlet port 62*f* labeled "Venting/Pressurized air". The inlet port 62*d* is closed.

If necessary, when eluting, it is not waited until the baseline is completely reached to avoid a generally unwanted dilution of the elution (the elution peak is "cut"). If the membrane chromatography modules 12 are to be reused in the same batch (intra-batch re-use), it should be noted that due to the incomplete elution, the binding sites are still "blocked". A further washing step, optionally a purification, is then performed before a new cycle starts. Depending on the peak cut point, the buffer is pushed into the product flow or into a flow path to the waste bag, and then the outlet port 62*f* is closed.

Figure 9A:
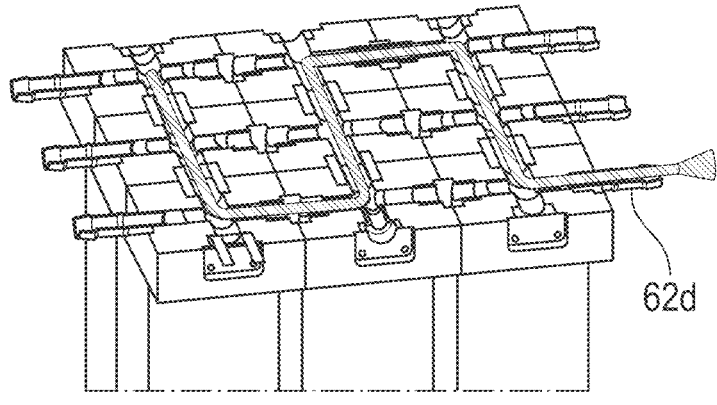
FIG. 9a shows the flow path through the cover means of the single-use device of FIG. 4 in the fifth mode of operation.

Similar to the purification step, with regard to a synchronization of the elution peaks in the elution step, the inflow and outflow paths are S-shaped and mirror-inverted to each other, as shown in FIG. 9*a*. The order of the membrane chromatography modules 12 in the inflow path and in the outflow path is thus the same as in the purification step. It also applies here that—with respect to the direction of flow—the first membrane chromatography module 12 in the inflow path is also the first module 12 in the outflow path, the second membrane chromatography module 12 in the inflow path is also the second module 12 in the outflow path, and so on. In general, the objective is again that the paths from the inflow port (here the inlet port 62*d*) through the respective module 12 to the outflow port (here the outlet port 62*i*) are all as exactly as possible the same length.

As the capacity of membrane adsorbers is in most cases not sufficient to purify a complete production batch in one run, a so-called multi-cycling concept is usually used—as already indicated—in which the membrane chromatography modules 12 are reused (intra-batch re-use). In this case, the process starts again at the washing or sanitization step after elution. It is also possible to start with the equilibration step instead of the washing step.

In the case of a multi-cycling operation, all elutions from the individual cycles are guided completely separately from the other media via a defined outlet and collected in a bag or another container (pooling).

Due to the multi-way valves 44 which are provided in the single-use device 10 and are connected to the control unit, automation or at least partial automation of the process steps described above can be easily implemented. Decisive therefor are the sensors 48, 50, 52, 54, which on the one hand signal when a medium/buffer enters or exits the system, and on the other hand output the signal for the actual chromatogram. By defining signal thresholds, it is possible to define intersections at which the control unit can perform switching in an automated manner. This is briefly explained below with reference to two examples.

Example 1: 1-molar sodium hydroxide solution as a cleaning medium can be easily distinguished from the running buffer due to the high pH value thereof. Sufficient removal of the cleaning medium is required: After the sanitizing step, rinsing must be carried out with sufficient buffer until, above all, the pH value (and where necessary also the conductivity) at the system outlet has (or have) reached a defined value. In this case, the inlet port 62*e* and the outlet port 62*j* for the rinsing buffer are switched to the inlet port 62*b* and outlet port 62*k* for the equilibration buffer or another buffer.

Example 2: Elution is started and reaches a maximum UV value. After the passage of a certain volume, the signal decays to a predetermined signal threshold. This event is detected and used to switch in an automated manner from the inlet port 62*d* and outlet port 62*i* to the inlet port 62*c* and outlet port 62*h* for the sodium hydroxide solution (unless another rinsing step is upstream) to initialize a next cycle.

The materials used in the single-use device 10 (including any flexible hose lines, etc.) are all sterilizable, particularly by gamma radiation, heat or gas, or adapted to be treated by autoclave. Prior to sterilization, the single-use device 10 can also be pre-cleaned (rinsed). The single-use device 10 can thus be sterilized in a pre-assembled, i.e. ready-to-connect state and be packaged, or can be packaged first and sterilized together with the packaging. After delivery to a customer, the entire single-use device 10 can be installed in an existing process line by means of pre-assembled sterile connectors (e.g. AseptiQuik®) or sterile welding of inlet and outlet hoses, i.e. it is immediately ready for use. Preferably, the single-use device 10 is delivered with sterile barriers at the inlet and outlet. If a pre-cleaning has taken place prior to delivery, the user does not have to spend time on rinsing, e.g., removing glycerol, which is used to stabilize the membranes.

To allow proper disposal of the single-use device 10, which includes a sterilization step in an autoclave, the membrane chromatography modules 12 are connected together in the single-use device 10 such that they can be detached from each other without much effort. The separation is preferably sterile using the product Quickseal® (Aseptic Tube Sealing System) or BioSealer® product to avoid contamination. For disposal, the size and weight of the separated segments are selected so that they can be carried by one person and transferred to an autoclave. Each separated filtration segment has at least one valve which can be opened during autoclaving to avoid overpressure in the filtration segment during sterilization.

10 Single-use device for separation or purification
12 Membrane chromatography module
14 Holder
18 Cross strut
20 Holding means
22 Pipe
24 Branch
26 Inlet and outlet unit
28 Inlet means
30 Outlet means
32 Housing wall
34 External port
36 Connecting component 38 Closure
40 Feed line
42 Prefilter
44 Valve
46 Vent valve
48 Conductivity sensor
50 pH sensor
52 UV sensor
54 Pressure sensor
56 Cover means
58 Bottom means
60 Segment
62*a-k* Ports
64 Line section
66 First connecting path
68 Second connecting path

The invention claimed is:

1. A single-use device for separating or purifying a volume of a mixture of substances,
comprising a plurality of membrane chromatography modules which are fixedly mounted in a predetermined grid, and
a line system for linking the membrane chromatography modules and for connecting the membrane chromatography modules to each other,
wherein the membrane chromatography modules are characterized with regard to membrane adsorber, design and/or size,
wherein the membrane chromatography modules and/or the line system are preconfigured for a desired process, and the membrane chromatography modules are upright in their position of use,
further comprising a cover means and/or a bottom means attached to an upper side or a lower side, respectively, of the plurality of membrane chromatography modules and holding the membrane chromatography modules in position in the predetermined grid, wherein at least part of the line system of the single-use device is formed in the cover means and/or the bottom means, with connecting lines between the membrane chromatography modules, and wherein the cover means comprises individual, firmly interconnected segments, each of which is assigned to a membrane chromatography module.

2. The single-use device according to claim 1, characterized in that at least some of the membrane chromatography modules are configured as spiral-wound modules.

3. The single-use device according to claim 1, characterized in that the single-use device has at least two separate inlets which are assigned to different media.

4. The single-use device according to claim 1, characterized in that a prefilter is arranged upstream of at least one membrane chromatography module, the prefilter comprising a pleated filter element, and the prefilter having a pore size of about 0.45 μm.

5. The single-use device according to claim 1, characterized in that at least some of the lines of the line system are configured as rigid lines.

6. The single-use device according to claim 1, characterized in that the membrane chromatography modules are arranged such that starting from an inflow path, a flow to some or all of the modules is parallel.

7. The single-use device according to claim 1, characterized in that the membrane chromatography modules are arranged such that a flow to at least one group of modules is parallel to at least one further group of modules, while the flow to the modules within the groups is sequential.

8. The single-use device according to claim 6, characterized in that the flow paths through the membrane chromatography modules exposed to a parallel flow are each of equal length.

9. The single-use device according to claim 1, characterized in that the membrane chromatography modules are arranged such that a flow to all of them is sequential.

10. The single-use device according to claim 1, characterized in that automated valves, which are controlled by a control unit, are provided at a plurality of points in the lines of the line system.

11. The single-use device according to claim 10, characterized in that an additional inlet or outlet is provided at a point in the line system where a valve is arranged.

12. The single-use device according to claim 10, characterized by at least one single-use conductivity sensor and/or one single-use pH sensor and/or one single-use UV sensor, which is arranged upstream of an inlet and/or downstream of an outlet of one of the plurality of membrane chromatography modules or a group of the plurality of membrane chromatography modules linked by the line system.

13. The single-use device according to claim 1, characterized by at least one single-use pressure sensor and/or one single-use flow sensor arranged in one of the lines of the line system.

14. The single-use device according to claim 12, characterized in that the at least one sensor is connected to the control unit.

15. The single-use device according to claim 1, characterized in that the single-use device in an assembled state forms a closed and pre-sterilized unit, the membrane chromatography modules being already equilibrated in a buffer medium.

16. The single-use device according to claim 1, characterized in that the interconnected segments of the cover means include individually preconfigured or preconfigurable ports and line sections.

17. The single-use device according to claim 1, characterized in that at least one sensor or spectroscopic means is attached to an otherwise unused port of the cover means or the bottom means.

18. A method of separating or purifying a volume of a mixture of substances, using a single-use device according to claim 1, the single-use device comprising a plurality of automated valves and sensors, including at least one sensor selected from the group consisting of a single-use conductivity sensor, a single-use pH sensor, a single-use UV sensor, a single-use pressure sensor, or a single-use flow sensor, wherein the sensors are connected to a control unit, and the automated valves are being controlled based on an evaluation of operating parameters measured by the sensors.

19. The method according to claim 18, characterized in that signal threshold values are defined in advance for the operating parameters and in that, depending on an exceeding or dropping below the signal threshold values, predetermined process steps of the separation or purification are automatically carried out, including a valve switching sequence for collecting selected and separated fractions.

* * * * *